ed July 23, 1963

3,098,851
17α-ALKYNYL - 2β-HALO-5α-ANDROSTANE-3α,17β-DIOLS, ESTERS THEREOF, AND INTERMEDIATES THERETO

Raymond E. Counsell, Skokie, and Paul D. Klimstra, Northbrook, Ill., assignors to G. D. Searle & Co., Chicago, Ill., a corporation of Delaware
No Drawing. Filed Nov. 20, 1961, Ser. No. 153,703
7 Claims. (Cl. 260—239.55)

The present invention relates to novel steroidal halohydrins and, more particularly, to 17α-alkynyl-2β-halo-5α-androstane-3α,17β-diols and the corresponding esters, which are represented by the structural formula

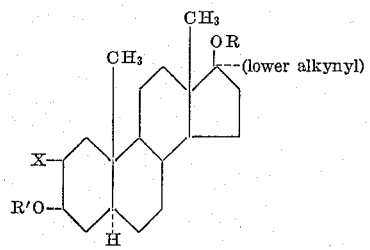

wherein X is a halo radical and R and R' can be hydrogen or a lower alkanoyl radical.

The halo radicals represented by X are fluoro, chloro, bromo, and iodo.

Examples of the lower alkanoyl radicals indicated in the structural representation supra are ethynyl, propynyl, butynyl, pentynyl, hexynyl, and the branched-chain isomers thereof. The lower alkanoyl radicals encompassed by the R and R' terms are, typically, formyl, acetyl, propionyl, butyryl, valeryl, caproyl, and the branched-chain radicals isomeric therewith.

The compounds of this invention are conveniently prepared by utilizing 3β-p-toluenesulfonoxy-5α-androstan-17-one, disclosed by Iriarte, Rosenkranz, and Sondheimer at J. Org. Chem., 20, 542 (1955), as the starting material. Heating a solution of that substance at the reflux temperature in a high boiling solvent such as collidine results in 5α-androst-2-en-17-one. The reaction of this ketone with a lower 1-alkyne affords the corresponding 17α-alkynyl-17β-ols, which are epoxidized, typically, by means of perbenzoic acid to yield the novel 2α,3α-epoxides of this invention. The reaction of these epoxides with the appropriate hydrogen halide results in the instant 2β,3α-halohydrins. These processes are typified by the reaction of the aforementioned 5α-androst-2-en-17-one with acetylene in the presence of potassium hydroxide to afford 17α-ethynyl-5α-androst-2-en-17β-ol, treatment of the latter substance with perbenzoic acid in benzene, resulting in 2α,3α-epoxy-17α-ethynyl-5α-androstan-17β-ol, and the reaction of that epoxide in chloroform with concentrated hydrochloric acid to afford 2β-chloro-17α-ethynyl-5α-androstane-3α,17β-diol.

Acylation of the aforementioned 17α-alkynyl-5α-androst-2-en-17β-ols, typically with a lower alkanoic acid anhydride in pyridine produces the corresponding 17-(lower alkanoates), which are submitted to the hereinbefore described processes to yield the instant novel 17α-alkynyl-2β-halo - 5α - androstane-3α,17β-diol 17-mono-(lower alkanoates). For example, 17α-ethynyl-5α-androst-2-en-17β-ol is heated at steam bath temperature with acetic anhydride and pyridine, resulting in 17α-ethynyl-5α-androst-2-en-17β-ol 17-acetate. Epoxidation with perbenzoic acid in benzene produces 2α,3α-epoxy-17α-ethynyl-5α-androstan-17β-ol 17-acetate, which is allowed to react with hydrobromic acid in chloroform to yield 2β-bromo-17α-ethynyl-5α-androstane-3α,17β-diol 17-acetate.

Treatment of the instant 3α,17β-diols with a limited quantity af acylating agent at room temperature affords the 3-mono-(lower alkanoates) of this invention, while reaction at elevated temperature with excess reagent produces the instant 3,17-di-(lower alkanoates). Thus, the aforementioned 2β-chloro-17α-ethynyl-5α-androstane-3α,17β-diol, when treated with acetic anhydride in pyridine by the latter processes, yields the corresponding 3-monoacetate and 3,17-diacetate, respectively. The 3,17-di-(lower alkanoates) can be prepared, alternatively, by heating with the appropriate isopropenyl ester in the presence of an acid catalyst such as p-toluenesulfonic acid. The diacetates, for example, are produced when the acylating agent is isopropenyl acetate. Acylation of the 17-mono-(lower alkanoates) at room temperature also produces the instant 3,17-di-(lower alkanoates).

The 2α,3α-epoxides and 2β,3α-halohydrins of this invention are useful as a result of their valuable pharmacological properties. They are, for example, estrogenic agents which lack androgenic and anabolic side-effects. The halohydrins are also hypocholesterolemic agents as is evidenced by their ability to inhibit the hepatic synthesis of cholesterol. The epoxides are, of course, useful also as intermediates in the manufacture of the instant halohydrins.

This application is a continuation-in-part of our copending application, Serial No. 33,949, filed June 6, 1960, now Patent No. 3,009,934.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 5 parts of 3β-p-toluenesulfonoxy-5α-androstan-17-one and 350 parts of purified collidine is stirred and heated at reflux for about 4 hours. This reaction mixture is cooled, then treated with ice and 500 parts by volume of 1 N sulfuric acid. The resulting mixture is extracted with ether, and the organic layer is washed successively with ice-cold 1 N sulfuric acid, aqueous sodium bicarbonate and water. This washed solution is dried and decolorized over a mixture of anhydrous sodium sulfate and decolorizing carbon, then evaporated to dryness to afford 5α-androst-en-17-one, M.P. 103–105°. Recrystallization from methanol affords a pure sample, M.P. 105–106:5°; $[\alpha]_D = +163°$ (chloroform).

Example 2

A solution of 950 parts of diethylene glycol dimethyl ether and 66 parts of diethylene glycol monomethyl ether is heated, under nitrogen, to about 135°, then treated portionwise with 180 parts of potassium hydroxide over a period of about 1½ hours. The solution is allowed to cool slowly to room temperature, then is cooled further to about 0°. To this mixture is added successively acetylene for about 2½ hours, then a solution of 50 parts of 5α-androst-2-en-17-one in 190 parts of diethylene glycol dimethyl ether over a period of about 1½ hours. Cooling and acetylene addition are continued for about 2½ hours longer, after which time the reaction mixture is diluted with 450 parts of water. The diluted solution is acidified with ice-cold dilute hydrochloric acid, and the resulting precipitate is collected by filtration and washed with water. The washed precipitate is dissolved in benzene, and the benzene solution is dried over anhydrous potassium carbonate containing decolorizing carbon, then is chromatographed on a silica gel column. Elution with 40% petroleum ether in benzene followed by recrystallization from acetone-hexane affords 17α-ethynyl-5α-androst-2-en-17β-ol, M.P. about 172–174°.

*Example 3*

A solution of 6 parts of 1-butyne and 40 parts of cold ether is added portionwise, in the course of 30 minutes, to a solution of butyl lithium, prepared from 17.3 parts of 1-bromobutane and 2.2 parts of lithium wire in 27 parts of ether. After completion of the addition, the mixture is stirred for 90 minutes at 0°. To this solution of butynyl lithium in ether is added, in the course of about 30 minutes, 9.5 parts of 5α-androst-2-en-17-one in 100 parts of tetrahydrofuran in small portions. After completion of the addition, the ether is removed by distillation, but the volume is maintained essentially constant by replacing the ether with tetrahydrofuran. The resulting mixture is heated at reflux for about 3 hours, then is poured into water, and the aqueous mixture is cooled by means of an ice-bath. The oily layer which forms is separated, dissolved in ether, and this organic solution is washed successively with water and saturated aqueous sodium chloride, then is dried over anhydrous sodium sulfate, and is finally evaporated to dryness in vacuo to afford 17α-(1-butynyl)-5α-androst-2-en-17β-ol.

*Example 4*

A solution of 10 parts of 17α-ethynyl-5α-androst-2-en-17β-ol in 325 parts by volume of 0.3 N perbenzoic acid in benzene is stored at 3° for about 15 hours. The precipitate which forms is collected by filtration, washed successively with benzene and with hexane, then dried to afford 2α,3α-epoxy-17α-ethynyl-5α-androstan-17β-ol, M.P. about 238–240°. The filtrate is washed successively with concentrated aqueous sodium carbonate and water, then dried over anhydrous potassium carbonate containing decolorizing carbon and evaporated to dryness in vacuo to afford a further quantity of the product. These two crops are combined and recrystallized from acetone to produce a pure sample of the epoxide, M.P. about 237–239°. It is represented by the structural formula

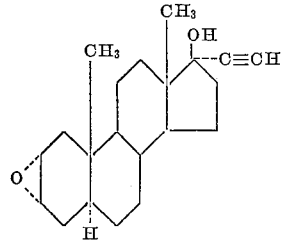

*Example 5*

The substitution of 10.94 parts of 17α-(1-butynyl)-5α-androst-2-en-17β-ol in the procedure of Example 4 results in 17α-(1-butynyl) - 2α,3α - epoxy-5α-androstan-17β-ol, which is represented by the structural formula

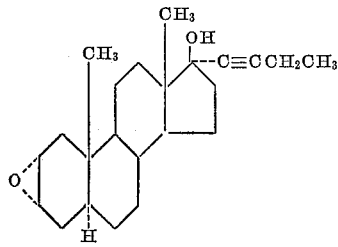

*Example 6*

To a solution of 5 parts of 2α,3α-epoxy-17α-ethynyl-5α-androstan-17β-ol in 450 parts of chloroform is added 156 parts of concentrated hydrochloric acid, and the heterogeneous mixture is shaken at room temperature for about 17 minutes. The organic layer is separated, washed with dilute aqueous sodium bicarbonate, then dried over anhydrous potassium carbonate containing decolorizing carbon. This solution is stripped of solvent at reduced pressure to afford an oil, which solidifies on standing. Recrystallization from aqueous methanol produces 2β-chloro-17α-ethynyl-5α-androstane-3α,17β-iol, M.P. about 105–109°. It is represented by the structural formula

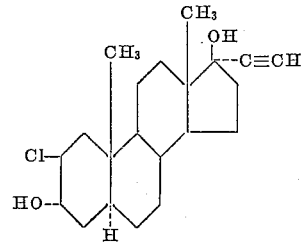

*Example 7*

A heterogeneous mixture consisting of one part of 2α,3α-epoxy-17α-ethynyl-5α-androstan-17β-ol dissolved in 90 parts of chloroform and 39 parts of 48% hydrobromic acid is stirred rapidly at room temperature for about 20 minutes. The organic layer is separated, washed successively with water and dilute aqueous sodium bicarbonate, dried over anhydrous potassium carbonate containing decolorizing carbon, and stripped of solvent at reduced pressure to afford a glass. Crystallization of this glass from dilute methanol produces 2β-bromo-17α-ethynyl-5α-androstane-3α,17β-diol, M.P. about 165–170°. It is represented by the structural formula

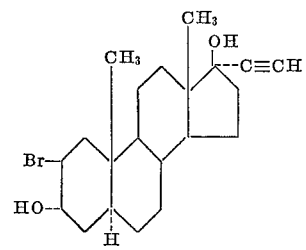

*Example 8*

To a solution of 1.4 parts of 2α,3α-epoxy-17α-ethynyl-5α-androstan-17β-ol in 90 parts of chloroform is added 27 parts of 48% hydriodic acid, and this two-phase system is stirred rapidly at room temperature for about 20 minutes. The organic layer is then separated, washed successively with water and dilute aqueous sodium bicarbonate, dried over anhydrous potassium carbonate containing decolorizing carbon, and concentrated to dryness in vacuo. The glassy residue is crystallized from acetone-hexane to afford the acetonate of 17α-ethynyl-2β-iodo-5α-androstane-3α,17β-diol, M.P. about 141–142° (dec.), which is represented by the structural formula

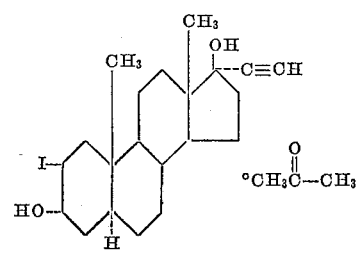

*Example 9*

Into a mixture of 34 parts of tetrahydrofuran and 21 parts of chloroform, cooled to about −70°, is bubbled 20.8 parts of anhydrous hydrogen fluoride. To this solution, with stirring and cooling by means of an ice-bath, is added, over a period of about 2½ hours, a solution of 10 parts of 2α,3α-epoxy-17α-ethynyl-5α-androstan-17β-ol in 96 parts of chloroform. Anhydrous hydrogen fluoride is bubbled slowly through the reaction mixture during the latter addition. Stirring is continued for about 1½ hours after the addition is complete, during which time the mixture is allowed to warm to room temperature. This solution is poured cautiously into excess concentrated aqueous potassium carbonate, and the resulting aqueous mixture is extracted with chloroform. The organic layer is separated, washed successively with water, dilute aqueous sodium bicarbonate, and water, dried over anhydrous potassium carbonate containing decolorizing carbon, and concentrated to dryness. The residual yellow oil is chromotographed on a silica gel column. Elution with benzene-ethyl acetate followed by recrystallization from acetone-hexane produces 17α-ethynyl-2β-fluoro-5α-androstane-3α,17β-diol, which exhibits maxima in the infrared at about 2.75, 3.01, 3.41, and 9.68 microns. It is represented by the structural formula

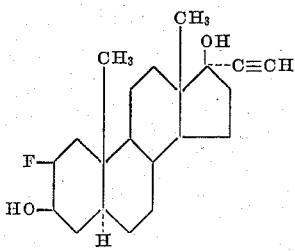

*Example 10*

The substitution of 5.45 parts of 17α-(1-butynyl)-2α,3α-epoxy-5α-androstan-17β-ol in the procedure of Example 6 results in 17α-(1-butynyl)-2β-chloro-5α-androstane-3α,17β-diol, which is represented by the structural formula

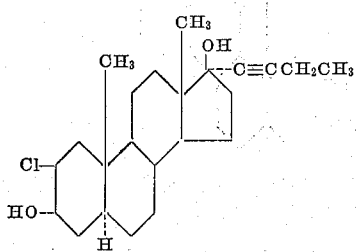

*Example 11*

A mixture of 5 parts of 2β-chloro-17α-ethynyl-5α-antrostane-3α,17β-diol, 10 parts of acetic anhydride, and 100 parts of pyridine is allowed to stand at room temperature for about 8 hours, then is poured slowly into a mixture of ice and water. The resulting precipitate is collected by filtration and dried to afford 3α-acetoxy-2β-chloro-17α-ethynyl - 5α - androstan-17β-ol. It is represented by the structural formula

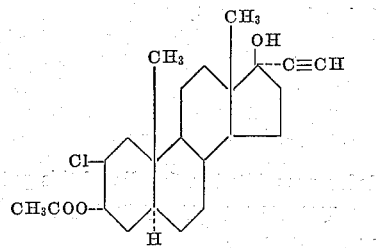

*Example 12*

A mixture of 5 parts of 2β-bromo-17α-ethynyl-5α-androstane-3α,17β-diol, 13 parts of propionic anhydride, and 100 parts of pyridine is allowed to stand at room temperature for about 8 hours. This reaction mixture is diluted with ice and water, and the reulting precipitate is collected by filtration, then dried to produce 2β-bromo-17α-ethynyl-3α-propionoxy-5α-androstan-17β-ol, which is represented by the structural formula

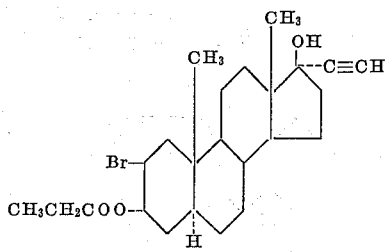

*Example 13*

To a solution of one part of 2β-chloro-17α-ethynyl-5α-androstane-3α,17β-diol in 20 parts of isopropenyl acetate is added 0.15 part of p-toluenesulfonic acid monohydrate, and this mixture is heated gently for about 7 hours, during which time the acetone formed is allowed to distil. The reaction mixture is cooled and diluted with about 70 parts of ether, then is washed successively with water, aqueous sodium bicarbonate, and water. The organic solution is dried and decolorized over a mixture of anhydrous potassium carbonate and decolorizing carbon, and the solvent is removed to afford a yellow oil. Crystallization from aqueous ethanol results in 2β-chloro-17α-ethynyl-5α-androstane-3α,17β-diol 3,17-diacetate. It is represented by the structural formula

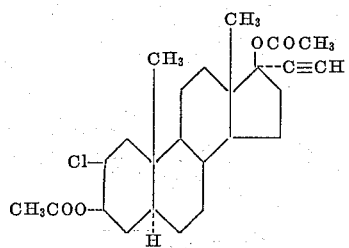

*Example 14*

The reaction of 8.9 parts of 2β-chloro-17α-ethynyl-5α-androstane-3α,17β-diol, 227 parts of isopropenyl propionate, and 1.5 parts of p-toluenesulfonic acid monohydrate according to the procedure of Example 13 results in 2β-chloro-17α-ethynyl-5α-androstane-3α,17β-diol 3,17-dipropionate, which is represented by the structural formula

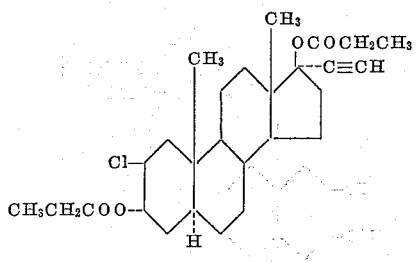

*Example 15*

A mixture of one part of 17α-ethynyl-5α-androst-2-en-17β-ol, 10 parts of acetic anhydride, and 20 parts of pyridine is heated on the steam bath for about 4 hours, then is cooled and poured into water. The resulting precipitate is collected by filtration, then is dried and recrystallized from hexane to afford 17α-ethynyl-5α-androst-2-en-17β-ol 17-acetate, M.P. about 119–121°. It is represented by the structural formula

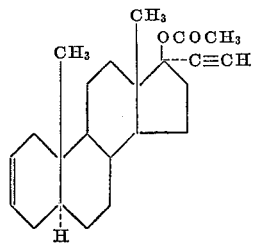

Example 16

The substitution of 13 parts of propionic anhydride in the procedure of Example 15 results in 17α-ethynyl-5α-androst-2-en-17β-ol 17-propionate.

Example 17

The substitution of 11.4 parts of 17α-ethynyl-5α-androst-2-en-17β-ol 17-acetate in the procedure of Example 4 results in 2α,3α-epoxy-17α-ethynyl-5α-androstan-17β-ol 17-acetate.

Example 18

By substituting 11.9 parts of 17α-ethynyl-5α-androst-2-en-17β-ol 17-propionate in the procedure of Example 4, 2α,3α-epoxy-17α-ethynyl-5α-androstan-17β-ol 17-propionate is obtained.

Example 19

The substitution of 5.67 parts of 2α,3α-epoxy-17α-ethynyl-5α-androstan-17β-ol 17-acetate in the procedure of Example 6 results in 2β-chloro-17α-ethynyl-5α-androstane-3α,17β-diol 17-acetate, which is represented by the structural formula

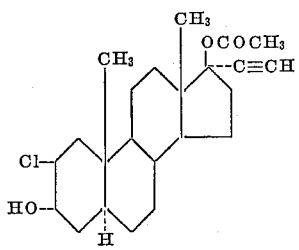

Example 20

The substitution of 1.18 parts of 2α,3α-epoxy-17α-ethynyl-5α-androstan-17β-ol 17-propionate in the procedure of Example 7 results in 2β-bromo-17α-ethynyl-5α-androstane-3α,17β-diol 17-propionate, which is represented by the structural formula

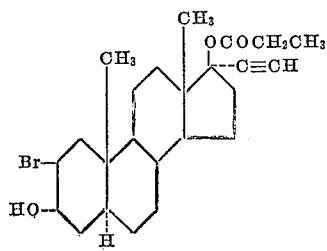

Example 21

The substitution of 1.09 parts of 17α-(1-butynyl)-5α-androst-2-en-17β-ol in the procedure of Example 15 results in 17α-(1-butynyl)-5α-androst-2-en-17β-ol 17-acetate.

Example 22

By substituting 12.3 parts of 17α-(1-butynyl)-5α-androst-2-en-17β-ol 17-acetate and otherwise proceeding according to the processes of Example 4, 17α-(1-butynyl)-2α,3α-epoxy-5α-androstan-17β-ol 17-acetate is obtained.

Example 23

By substituting 6.12 parts of 17α-(1-butynyl)-2α,3α-epoxy-5α-androstan-17β-ol 17-acetate and otherwise proceeding according to the processes of Example 6, 17α-(1-butynyl)-2β-chloro-5α-androstane-3α,17β-diol 17-acetate is obtained.

Example 24

The substitution of 5.4 parts of 17α-(1-butynyl)-2β-chloro-5α-androstane-3α,17β-diol in the procedure of Example 11 results in 3α-acetoxy-17α-(1-butynyl)-2β-chloro-5α-androstan-17β-ol.

Example 25

By substituting 1.08 parts of 17α-(1-butynyl)-2β-chloro-5α-androstane-3α,17β-diol and otherwise proceeding according to the processes of Example 13, 17α-(1-butynyl)-2β-chloro-5α-androstane-3α,17β-diol 3,17-diacetate is obtained.

What is claimed is:

1. A compound of the structural formula

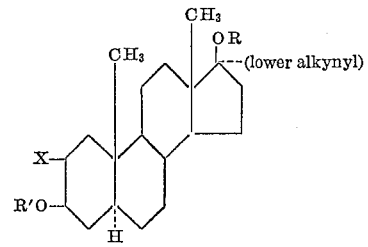

wherein X is a halo radical and R and R' are selected from the group consisting of hydrogen and lower alkanoyl radicals.

2. A compound of the structural formula

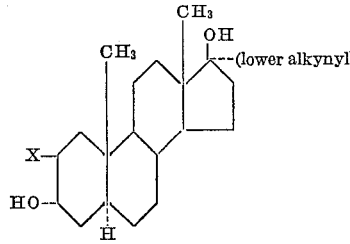

wherein X is a halo radical.
3. 2β-chloro-17α-ethynyl-5α-androstane-3α,17β-diol.
4. 2β-bromo-17α-ethynyl-5α-androstane-3α,17β-diol.
5. 17α-ethynyl-2β-iodo-5α-androstane-3α,17β-diol.
6. 17α-ethynyl-2β-fluoro-5α-androstane-3α,17β-diol.
7. 2α,3α-epoxy-17α-ethynyl-5α-androstan-17β-ol.

References Cited in the file of this patent
UNITED STATES PATENTS
2,996,524  Huffman _____ Aug. 15, 1961